United States Patent
Tamachi et al.

(10) Patent No.: US 12,194,862 B2
(45) Date of Patent: Jan. 14, 2025

(54) ELECTRIFIED VEHICLE AND METHOD FOR MANUFACTURING ELECTRIFIED VEHICLE

(71) Applicant: TOYOTA JIDOSHA KABUSHIKI KAISHA, Aichi-ken (JP)

(72) Inventors: Toshiaki Tamachi, Seto (JP); Masato Nakano, Toyota (JP); Masayuki Katou, Toyota (JP); Takaaki Sakai, Nisshin (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 266 days.

(21) Appl. No.: 18/062,579

(22) Filed: Dec. 7, 2022

(65) Prior Publication Data
US 2023/0278435 A1 Sep. 7, 2023

(30) Foreign Application Priority Data
Mar. 2, 2022 (JP) ................. 2022-032041

(51) Int. Cl.
*B60W 10/08* (2006.01)
*B60L 15/00* (2006.01)
(Continued)

(52) U.S. Cl.
CPC ......... *B60L 15/2054* (2013.01); *B60L 15/007* (2013.01); *B60W 10/02* (2013.01);
(Continued)

(58) Field of Classification Search
CPC .. F16H 63/502; F16H 61/04; F16H 2059/366; B60W 10/08; B60W 10/02;
(Continued)

(56) References Cited

U.S. PATENT DOCUMENTS 11,654,890 B2 * 5/2023 Hashimoto ........... B60W 20/20
701/22
2014/0336858 A1 11/2014 Matsushima et al.
(Continued)

FOREIGN PATENT DOCUMENTS

DE 10301534 A1 * 7/2004 ........... B60W 10/06
JP 2014-176179 A 9/2014
(Continued)

OTHER PUBLICATIONS

English translation of DE10301534A1; http://translationportal.epo.org; Oct. 21, 2024 (Year: 2024).*
(Continued)

*Primary Examiner* — Roger L Pang
(74) *Attorney, Agent, or Firm* — HAUPTMAN HAM, LLP

(57) ABSTRACT

An electrified vehicle includes a motor, a clutch, a transmission, a rotational speed sensor configured to detect a rotational speed of the motor, and a control circuit configured to control the motor. The control circuit performs: a learning process of detecting a change in the rotational speed of the motor by the rotational speed sensor when the shift change is performed; and a control process of controlling the rotational speed of the motor based on the change in the rotational speed detected in the learning process, when the shift change is performed after the learning process.

12 Claims, 7 Drawing Sheets

(51) Int. Cl.
   *B60L 15/20* (2006.01)
   *B60W 10/02* (2006.01)
   *B60W 30/19* (2012.01)
   *B60W 30/20* (2006.01)

(52) U.S. Cl.
   CPC ............ *B60W 10/08* (2013.01); *B60W 30/19* (2013.01); *B60L 2240/12* (2013.01); *B60L 2240/507* (2013.01); *B60W 2030/203* (2013.01); *B60W 2510/0216* (2013.01); *B60W 2510/081* (2013.01); *B60W 2510/082* (2013.01); *B60W 2510/083* (2013.01); *B60W 2710/081* (2013.01)

(58) Field of Classification Search
   CPC ........... B60W 30/19; B60W 2030/203; B60W 2510/081; B60W 2510/082; B60W 2510/083; B60W 2710/081; B60L 15/2054; B60L 15/007; B60L 2240/507; B60L 2260/46
   USPC ................................ 477/20, 3, 5; 701/22, 58
   See application file for complete search history.

(56) References Cited

U.S. PATENT DOCUMENTS

| | | |
|---|---|---|
| 2017/0197628 A1 | 7/2017 | Nefcy et al. |
| 2023/0202308 A1* | 6/2023 | Cho ........................ H02P 21/05 701/22 |

FOREIGN PATENT DOCUMENTS

| | | |
|---|---|---|
| JP | 2015-087001 A | 5/2015 |
| JP | 2017-223211 A | 12/2017 |
| WO | 2013061359 A1 | 5/2013 |

OTHER PUBLICATIONS

Bazsó Gabor, Totalcar—Magazine—Porsche 912E electrical conversion, Galvanic Kozma Gréta 1., Mar. 25, 2021, URL: https://totalcar.hu/magazin/szerelem/2021/03/25/hogy_micsinalszhulye_elektromos_porschet/, retrieved on Jun. 30, 2023, 34pp.

Daily car. "From internal combustion engines to electric pickups Electric motor instead of engine", NAVER Post, Feb. 28, 2022, Apr. 11, 2024 search, Internet:https://m.post.naver.com/viewer/postView.naver?volumeNo=33371453&memberNo=16519581, 14pp.

* cited by examiner

FIG. 3

| COMBINATION OF GEAR STAGES BEFORE AND AFTER SHIFTING (TYPE OF SHIFT CHANGE) | SHIFT CHARACTERISTICS | TORSIONAL CHARACTERISTICS |
|---|---|---|
| FIRST GEAR → SECOND GEAR | 0.57 | GRAPH A |
| SECOND GEAR → THIRD GEAR | 0.68 | GRAPH B |
| THIRD GEAR → FOURTH GEAR | 0.70 | GRAPH C |
| FOURTH GEAR → FIFTH GEAR | 0.70 | GRAPH D |
| FIFTH GEAR → FOURTH GEAR | 1.43 | GRAPH E |
| FOURTH GEAR → THIRD GEAR | 1.43 | GRAPH F |
| THIRD GEAR → SECOND GEAR | 1.47 | GRAPH G |
| SECOND GEAR → FIRST GEAR | 1.75 | GRAPH H |

FIG. 4

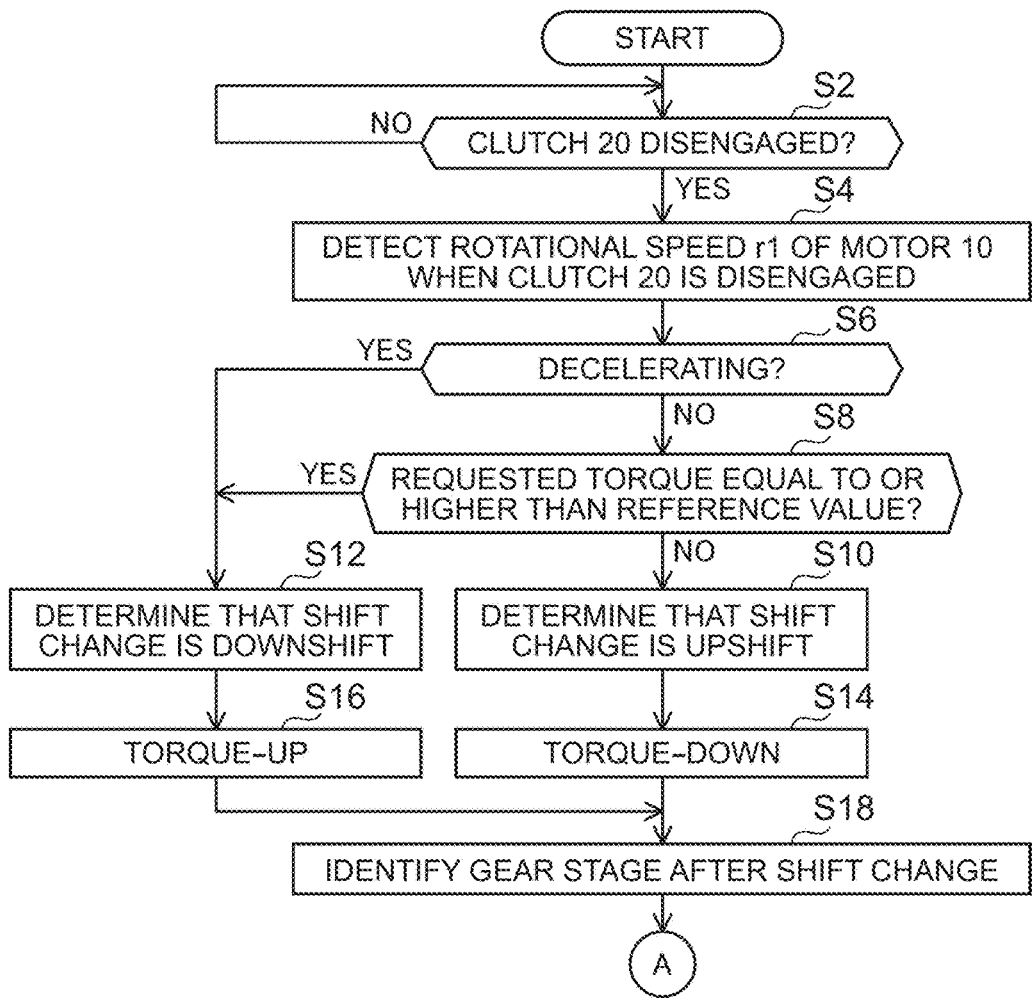

ELECTRIFIED VEHICLE AND METHOD FOR MANUFACTURING ELECTRIFIED VEHICLE

CROSS-REFERENCE TO RELATED APPLICATION

This application claims priority to Japanese Patent Application No. 2022-032041 filed on Mar. 2, 2022, incorporated herein by reference in its entirety.

BACKGROUND

1. Technical Field

The technique disclosed in the present specification relates to electrified vehicles and methods for manufacturing the same.

2. Description of Related Art

An electrified vehicle disclosed in WO2013/061359 includes a motor, a clutch, and a transmission. An input shaft of the transmission is connected to the motor through the clutch. An output shaft of the transmission transmits power to a drive wheel. The transmission changes a gear stage for transmitting power from the input shaft to the output shaft. The electrified vehicle includes a control circuit that controls the rotational speed of the motor during a shift change. The control circuit reduces a shift shock by controlling the rotational speed of the motor during the shift change.

SUMMARY

In the technique disclosed in WO2013/061359, a target rotational speed of the motor during a shift change is set to an appropriate rotational speed, and the control circuit reduces a shift shock by controlling the rotational speed of the motor to the target rotational speed during the shift change. Therefore, the technique of WO2013/061359 cannot be used when an appropriate rotational speed is not known. For example, electrified vehicles are sometimes manufactured by replacing engines of various gasoline vehicles (e.g., used gasoline vehicles) with motors. In this case, an appropriate rotational speed that can reduce a shift shock varies depending on the structure of the original gasoline vehicle, and it is difficult to set the target rotational speed in the control circuit. The present disclosure proposes a technique of reducing a shift shock when an appropriate rotational speed is not known.

An electrified vehicle according to one aspect of the present disclosure includes a motor, a clutch, a transmission, a rotational speed sensor, and a control circuit. The transmission includes an input shaft and an output shaft. The input shaft is connected to the motor through the clutch. The output shaft transmits power to a drive wheel. The transmission changes a gear stage for transmitting the power from the input shaft to the output shaft. The rotational speed sensor detects a rotational speed of the motor. The control circuit controls the motor. The electrified vehicle is configured to perform a shift change in which the gear stage is changed after the clutch is disengaged and the clutch is engaged after the gear stage is changed. The control circuit is configured to perform: a learning process of detecting a change in the rotational speed of the motor by the rotational speed sensor when the shift change is performed; and a control process of controlling the rotational speed of the motor based on the change in the rotational speed detected in the learning process, when the shift change is performed after the learning process.

In the electrified vehicle according to the above aspect, the control circuit performs the learning process of detecting a change in the rotational speed of the motor by the rotational speed sensor when the shift change is performed. By detecting a change in the rotational speed of the motor during the shift change, the rotational speed of the motor that can reduce a shift shock can be calculated. The control circuit controls the rotational speed of the motor based on the change in the rotational speed detected in the learning process, when the shift change is performed after the learning process. Accordingly, the control circuit can appropriately control the rotational speed of the motor to reduce a shift shock.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a table showing shift characteristics and torsional characteristics stored in an electronic control unit (ECU);

FIG. 4 is a flowchart showing the first half of a process that is performed by the ECU during a shift change;

DETAILED DESCRIPTION OF EMBODIMENTS

Figure 1:
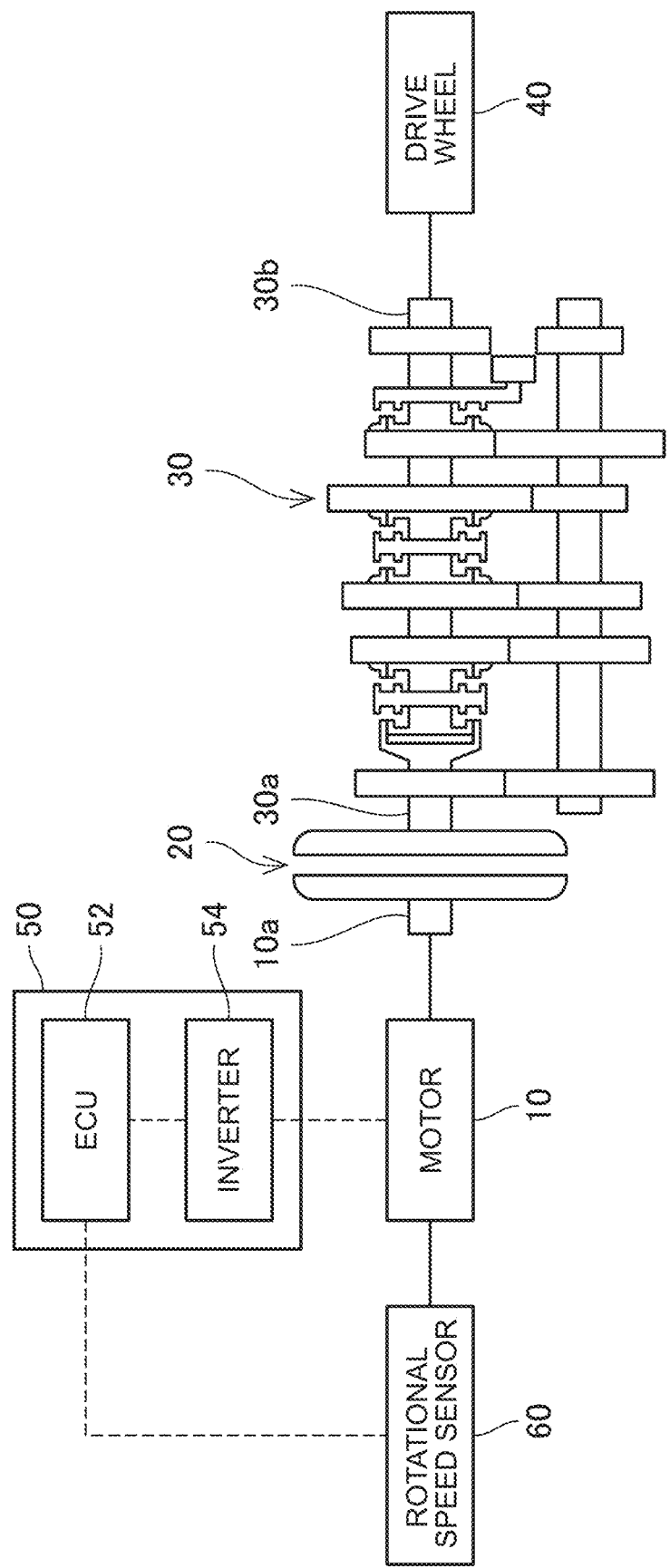
FIG. 1 is a block diagram of a drive system of an electrified vehicle.

In an example of an electrified vehicle disclosed in the present specification, in the learning process, the control circuit may detect a first rotational speed and a second rotational speed, the first rotational speed being a rotational speed of the motor at first time, the second rotational speed being a rotational speed of the motor at second time, the first time being when the clutch is disengaged, and the second time being when fluctuations of the rotational speed of the motor that occur after the clutch is engaged settle down. In the control process, the control circuit may change the rotational speed of the motor in a period from the first time to third time based on the first rotational speed and the second rotational speed, the third time being when the clutch is engaged.

With this configuration, the difference between the rotational speed of the motor and the rotational speed of the input shaft of the transmission when the clutch is engaged can be reduced. A shift shock can therefore be suitably reduced.

In the example of the electrified vehicle disclosed in the present specification, when the shift change in the control process is an upshift, the control circuit may reduce the rotational speed of the motor within the period from the first time to the third time. When the shift change in the control process is a downshift, the control circuit may increase the rotational speed of the motor within the period from the first time to the third time.

With this configuration, a shift shock can be suitably reduced.

In the example of the electrified vehicle disclosed in the present specification, when the shift change in the control process is the downshift, the control circuit may increase the rotational speed of the motor faster when requested torque for the motor after the clutch is disengaged is equal to or higher than a first reference value than when the requested torque for the motor after the clutch is disengaged is less than the first reference value.

With this configuration, when the requested torque is equal to or higher than the first reference value, the rotational speed of the motor can be quickly increased to an appropriate value, and a downshift can be quickly performed with a small shift shock.

In the example of the electrified vehicle disclosed in the present specification, in the control process, the control circuit may perform rotational speed control of keeping a target rotational speed of the motor constant from the third time to the second time, and may stop the rotational speed control when the rotational speed of the motor detected by the rotational speed sensor after the third time changes with a gradient equal to or greater than a second reference value.

With this configuration, the rotational speed control can be stopped when the rotational speed of the motor does not match the rotational speed of the input shaft of the transmission during the rotational speed control.

In the example of the electrified vehicle disclosed in the present specification, in the learning process, the control circuit may detect a fluctuation waveform of the rotational speed of the motor generated after the clutch is engaged. In the control process, the control circuit may control the motor so as to reduce fluctuations of the rotational speed of the motor that are going to occur after the clutch is engaged, based on the fluctuation waveform detected in the learning process.

With this configuration, the fluctuations of the rotational speed of the motor can be reduced after the clutch is engaged.

In the example of the electrified vehicle disclosed in the present specification, the control circuit may store in a storage area the change in the rotational speed for each of combinations of the gear stages before and after the shift change. In the control process, the control circuit may estimate a combination of the gear stages before and after the shift change, read the change in the rotational speed corresponding to the estimated combination from the storage area, and control the rotational speed of the motor based on the read change in the rotational speed.

With this configuration, the rotational speed of the motor can be appropriately controlled according to the combination of the gear stages before and after the shift change.

In the example of the electrified vehicle disclosed in the present specification, the control circuit may estimate that the gear stage when the electrified vehicle is started is first gear. When the shift change is an upshift, the control circuit may estimate that the gear stage has been shifted up by one stage. When the shift change is a downshift, the control circuit may estimate that the gear stage has been shifted down by one stage.

With this configuration, the gear stage can be estimated without using a sensor for detecting the gear stage.

In the example of the electrified vehicle disclosed in the present specification, the control circuit may determine whether the shift change is the upshift or the downshift based on a gradient of the change in the rotational speed of the motor before the clutch is disengaged.

With this configuration, whether the shift change is an upshift or a downshift can be detected without using a sensor for detecting the gear stage.

In the example of the electrified vehicle disclosed in the present specification, the control circuit may determine whether the shift change is the upshift or the downshift based on a gradient of the change in the rotational speed of the motor before the clutch is disengaged and the requested torque for the motor after the clutch is disengaged.

With this configuration, whether the shift change is an upshift or a downshift can be detected without using a sensor for detecting the gear stage.

In the example of the electrified vehicle disclosed in the present specification, the control circuit may determine whether the clutch is engaged or disengaged based on a ratio between an amount of change in the rotational speed of the motor detected by the rotational speed sensor and drive torque of the motor.

With this configuration, whether the clutch is engaged or disengaged can be detected without using a sensor for detecting the state of the clutch.

The present specification proposes a method for manufacturing the above electrified vehicle. This method includes preparing a vehicle including an engine connected to the input shaft of the transmission through the clutch; and replacing the engine of the vehicle with the motor.

In an electrified vehicle manufactured by this method, the rotational speed at which a shift shock is less likely to occur varies depending on the characteristics of a drive system of the original vehicle. A shift shock can be reduced by mounting the control circuit that performs the learning process and the control process on the vehicle manufactured by this method.

Figure 2:
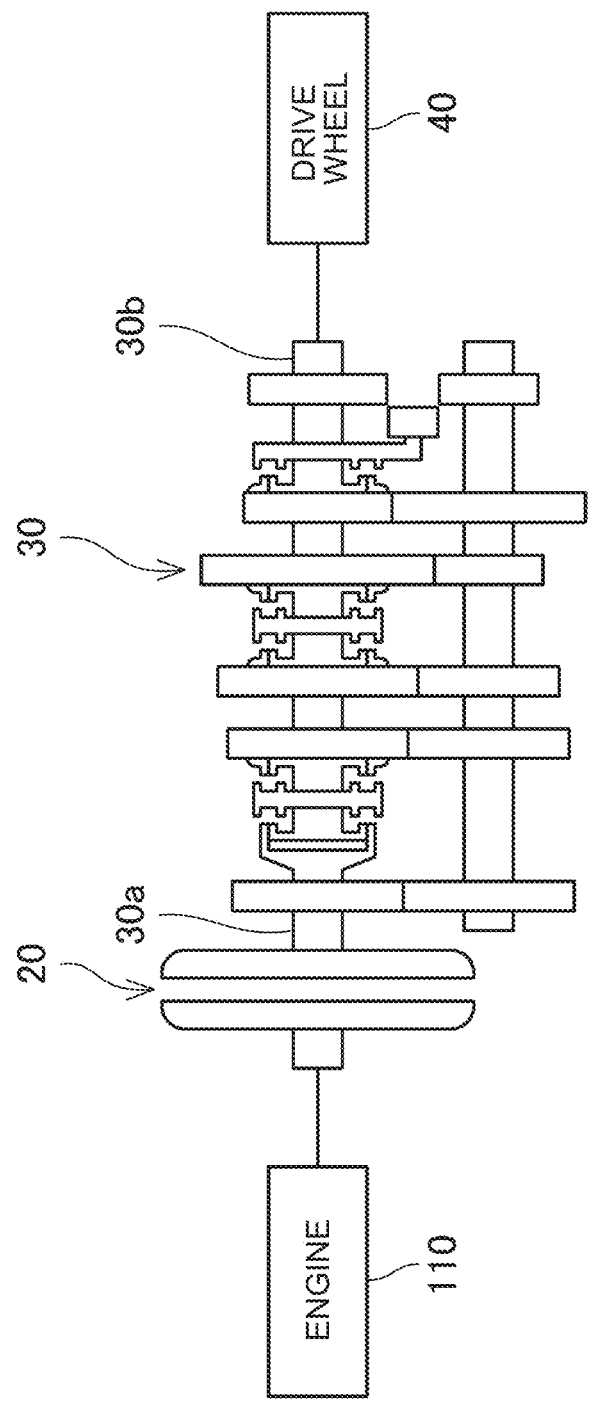
FIG. 2 is a block diagram of a drive system of a gasoline vehicle that is used to manufacture the electrified vehicle.

FIG. 1 shows a drive system of an electrified vehicle according to an embodiment. The electrified vehicle shown in FIG. 1 travels when a motor 10 drives a drive wheel 40. The electrified vehicle shown in FIG. 1 is a vehicle manufactured using a gasoline vehicle shown in FIG. 2. The gasoline vehicle shown in FIG. 2 includes an engine 110, a clutch 20, and a transmission 30. In the gasoline vehicle shown in FIG. 2, power is transmitted from the engine 110 to the drive wheel 40 via the clutch 20 and the transmission 30. The electrified vehicle shown in FIG. 1 is manufactured by replacing the engine 110 of the gasoline vehicle shown in FIG. 2 with the motor 10. Therefore, in the electrified vehicle shown in FIG. 1, power is transmitted from the motor 10 to the drive wheel 40 via the clutch 20 and the transmission 30.

The motor 10 includes an output shaft 10a. The transmission 30 includes an input shaft 30a and an output shaft 30b. The output shaft 10a of the motor 10 is connected to the input shaft 30a of the transmission 30 via the clutch 20. When the clutch 20 is engaged, power is allowed to be transmitted from the output shaft 10a of the motor 10 to the input shaft 30a of the transmission 30. When the clutch 20 is disengaged, power is not allowed to be transmitted from the output shaft 10a of the motor 10 to the input shaft 30a of the transmission 30. The clutch 20 is operated by a driver. The transmission 30 has a plurality of gear stages. Power is transmitted from the input shaft 30a to the output shaft 30b through the gear stage. The transmission 30 changes the rotation ratio of the input shaft 30a to the output shaft 30b (i.e., the speed ratio) by changing the gear stage for transmitting power from the input shaft 30a to the output shaft 30b. The gear stage of the transmission 30 is changed by the driver operating a shift lever. That is, the transmission 30 is a so-called manual transmission. The output shaft 30b of the transmission 30 is connected to the drive wheel 40 via a pinion gear, a ring gear, a drive shaft, etc., not shown.

The electrified vehicle shown in FIG. 1 includes a control circuit 50 configured to control the motor 10, and a rotational speed sensor 60 configured to detect the rotational speed (unit: rpm) of the motor 10. The control circuit 50 includes an electronic control unit (ECU) 52 and an inverter 54. The inverter 54 supplies alternating current (AC) power to the motor 10. That is, the motor 10 is an AC motor that is driven by AC power. The ECU 52 controls the inverter 54 to control the frequency and amplitude of the AC power to be supplied from the inverter 54 to the motor 10. The rotational speed and drive torque of the motor 10 are thus controlled. The rotational speed sensor 60 detects the rotational speed of the output shaft 10a of the motor 10.

Since various gasoline vehicle standards are used to manufacture electrified vehicles, the detection values from sensors included in the original gasoline vehicle (e.g., a sensor configured to detect the state of the clutch 20, a sensor configured to detect the gear stage of the transmission 30, and a sensor configured to detect the rotational speed of the output shaft 30b of the transmission 30) cannot be input to the ECU 52. Therefore, the ECU 52 detects the state of the drive system based on the rotational speed of the motor 10 detected by the rotational speed sensor 60. Drive systems (i.e., the clutch 20, the transmission 30, etc.) of gasoline vehicles that are used to manufacture electrified vehicles have various characteristics during a shift change. Therefore, in the electrified vehicle shown in FIG. 1, the ECU 52 learns the characteristics of the drive system during a shift change, and controls the rotational speed of the motor 10 during a shift change according to the learning results. Hereinafter, a process that is performed by the ECU 52 during a shift change will be described.

The ECU 52 estimates the gear stage at the time of starting of the electrified vehicle to be first gear. As will be described in detail later, when a shift change is performed, the ECU 52 determines whether the shift change is an upshift or a downshift. When the ECU 52 determines that the shift change is an upshift, the ECU 52 estimates that the gear stage has been shifted up by one stage. When the ECU 52 determines that the shift change is a downshift, the ECU 52 estimates that the gear stage has been shifted down by one stage. The ECU 52 thus always identifies the current gear stage while the electrified vehicle is traveling.

The ECU 52 has a storage area. The ECU 52 stores shift characteristics and torsional characteristics of the drive system in the storage area. The shift characteristics are an index of how much the rotational speed of the input shaft 30a of the transmission 30 changes during a shift change. For example, as shown in FIG. 3, the ECU 52 stores shift characteristics for each of combinations of gear stages before and after a shift change. The shift characteristics will be described in detail later. The torsional characteristics are characteristics representing fluctuations of the rotational speed of the motor 10 that occur during a shift change. For example, as shown in FIG. 3, the ECU 52 stores torsional characteristics for each of the combinations of gear stages before and after a shift change. The torsional characteristics will be described in detail later. The shift characteristics and torsional characteristics to be stored in the storage area are acquired by the ECU 52 performing a learning process. Therefore, when the ECU 52 has not yet learned the shift characteristics and the torsional characteristics, empty values (i.e., NULL values) are stored in the storage area of the ECU 52 as the shift characteristics and the torsional characteristics.

Figure 5:
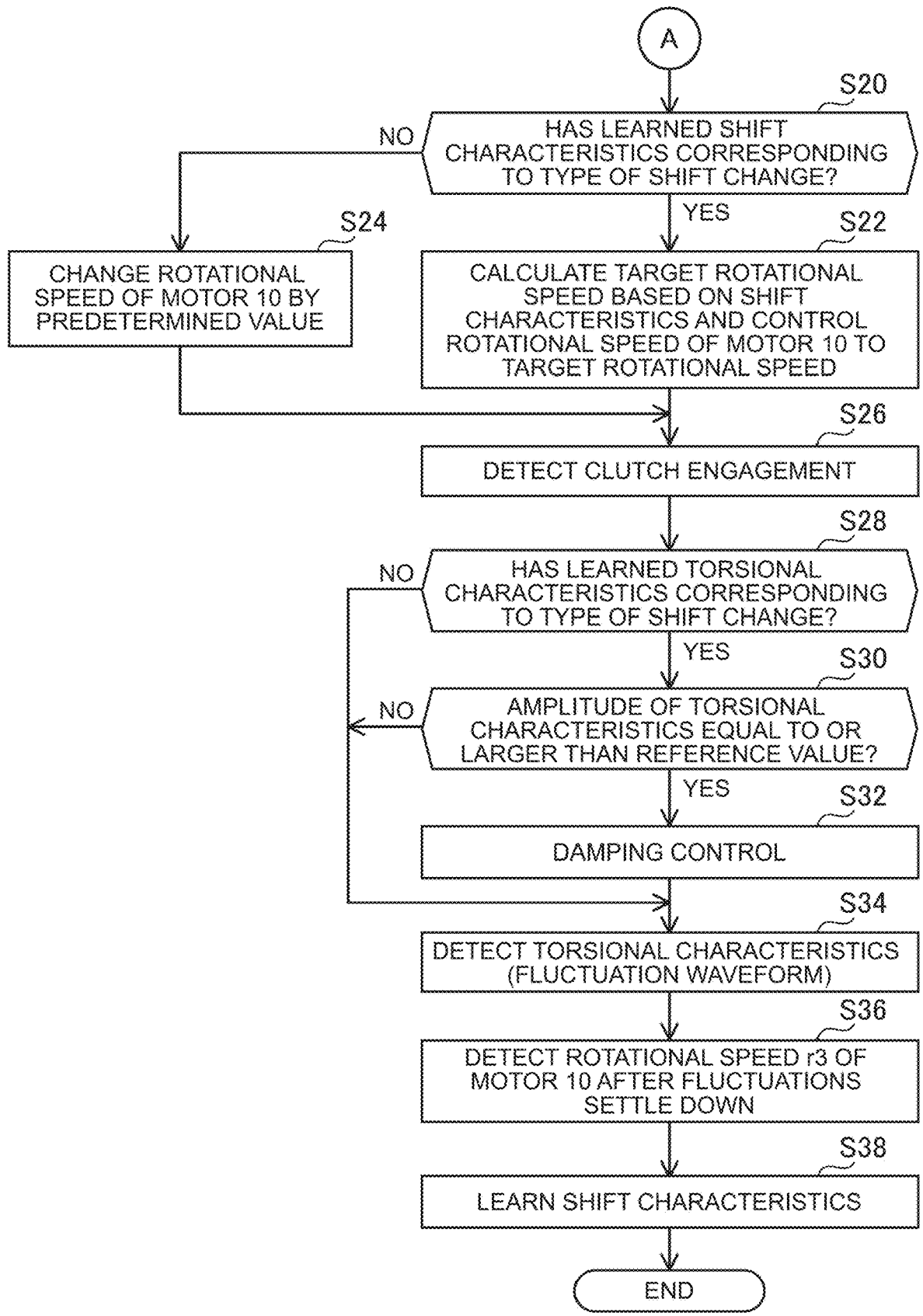
FIG. 5 is a flowchart showing the second half of the process that is performed by the ECU during a shift change.

FIGS. 4 and 5 show a process that is performed by the ECU 52 during a shift change. In step S2, the ECU 52 determines whether the clutch 20 is disengaged. The ECU 52 repeatedly performs step S2 while the electrified vehicle is traveling. In step S2, the ECU 52 detects whether the clutch 20 is disengaged based on the ratio between the torque command value for the motor 10 and the amount of change in rotational speed of the motor 10 detected by the rotational speed sensor 60. That is, when the clutch 20 is disengaged, the motor 10 is disconnected from the drive wheel 40, and therefore the rotational speed of the motor 10 tends to change. Therefore, even when the torque command value is the same, the amount of change in rotational speed of the motor 10 is much larger when the clutch 20 is disengaged than when the clutch 20 is engaged. In step S2, the ECU 52 determines that the clutch 20 is disengaged when a value obtained by dividing the amount of change in rotational speed of the motor 10 by the torque command value is equal to or larger than a reference value.

The driver changes the gear stage of the transmission 30 after disengaging the clutch 20. When the gear stage is changed, the rotational speed of the input shaft 30a of the transmission 30 changes. That is, the rotational speed of the input shaft 30a of the transmission 30 increases in the case of a downshift. The rotational speed of the input shaft 30a of the transmission 30 decreases in the case of an upshift. The driver engages the clutch 20 after changing the gear stage. When the clutch 20 is engaged with the difference between the rotational speed of the motor 10 (i.e., the rotational speed of the output shaft 10a of the motor 10) and the rotational speed of the input shaft 30a of the transmission 30 being large, a large shift shock occurs. Therefore, the ECU 52 can perform a process of reducing the difference between the rotational speed of the motor 10 and the rotational speed of the input shaft 30a of the transmission 30 during the period from when the clutch 20 is disengaged to when the clutch 20 is engaged. The ECU 52 can also perform damping control for reducing fluctuations after the clutch 20 is engaged. The process that is performed by the ECU 52 varies depending on whether the ECU 52 has learned the shift characteristics and the torsional characteristics.

Figure 6:
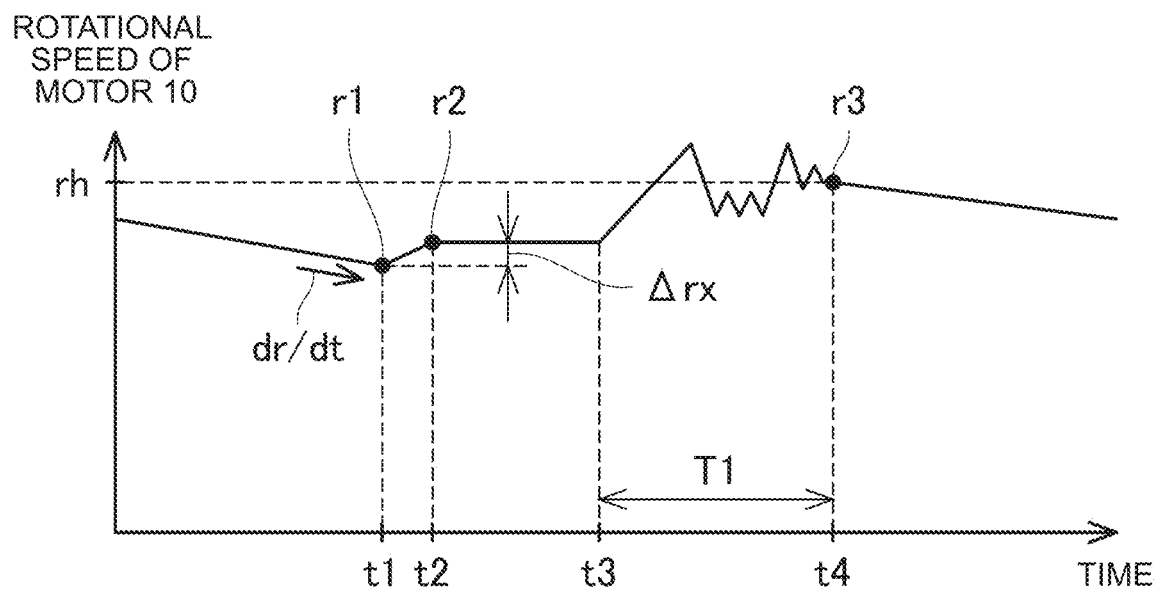
FIG. 6 is a graph showing the rotational speed of a motor during a downshift when the ECU has not yet learned the shift characteristics and the torsional characteristics.
Figure 7:
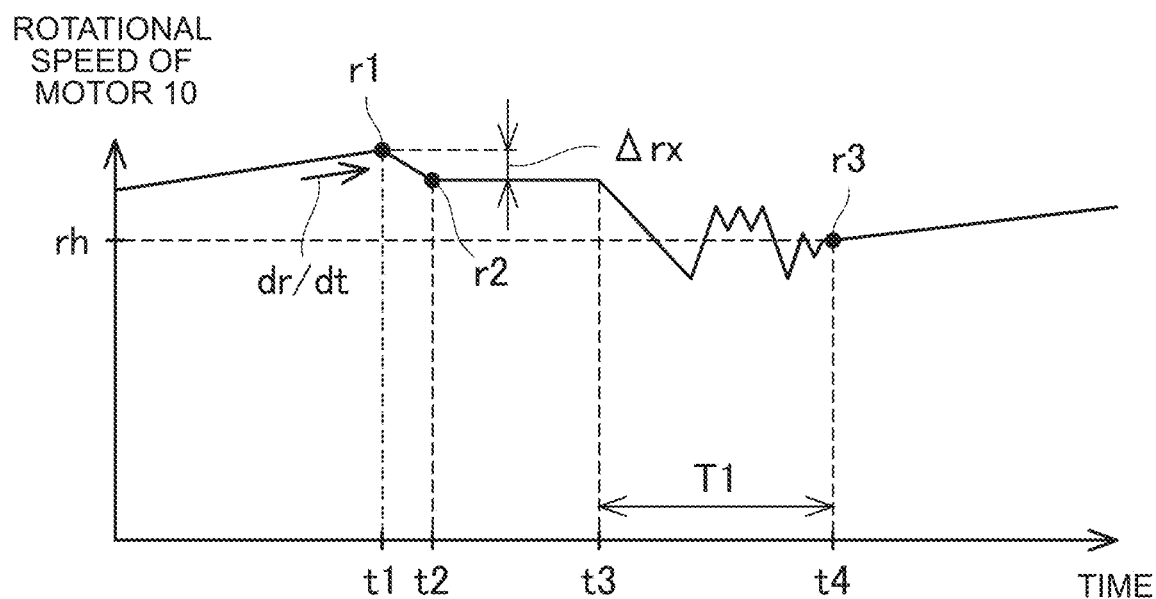
FIG. 7 is a graph showing the rotational speed of the motor during an upshift when the ECU has not yet learned the shift characteristics and the torsional characteristics.

First, an example in which the ECU 52 has not yet learned the shift characteristics and the torsional characteristics will be described. FIGS. 6 and 7 show changes in rotational speed of the motor 10 during a shift change when the ECU 52 has not yet learned the shift characteristics and the torsional characteristics. In FIGS. 6 and 7, time t1 is when the ECU 52 determines in step S2 that the clutch 20 is disengaged.

When the ECU 52 determines that the clutch 20 is disengaged, the ECU 52 performs step S4. In step S4, the ECU 52 detects the rotational speed of the motor 10 at time t1 when the clutch 20 is disengaged (hereinafter referred to as the "rotational speed r1") by the rotational speed sensor 60. The ECU 52 stores the rotational speed r1.

Next, the ECU 52 determines in steps S6 to S12 whether the shift change is an upshift or a downshift.

In step S6, the ECU 52 determines whether the electrified vehicle is decelerating. In this example, the ECU 52 determines whether the electrified vehicle is decelerating, based on the rate of change dr/dt of the rotational speed of the motor 10 when the clutch 20 is disengaged. That is, when the rate of change dr/dt is a negative value, the electrified vehicle is decelerating. Therefore, the ECU 52 determines YES in step S6. For example, in FIG. 6, the rotational speed of the motor 10 is decreasing at time t1. The ECU 52 therefore determines YES in step S6. When the rate of change dr/dt is a positive value or zero, the electrified vehicle is accelerating or traveling at a constant speed. Therefore, the ECU 52 determines NO in step S6. For example, in FIG. 7, the rotational speed of the motor 10 is increasing at time t1. The ECU 52 therefore determines NO in step S6.

When YES in step S6, the ECU 52 determines in step S12 that the shift change is a downshift.

When NO in step S6, the ECU 52 determines in step S8 whether requested torque input to the ECU 52 is equal to or higher than a reference value (a first reference value). The requested torque input to the ECU 52 varies depending on the amount of depression of an accelerator pedal operated by the driver. In a normal shift change, the requested torque is low because the driver does not depress the accelerator pedal. However, in a technique called throttle blipping, the driver depresses the accelerator pedal simultaneously with the shift change. In this case, the requested torque increases to the reference value or higher during the shift change. In step S8, the ECU 52 determines whether the driver is blipping the throttle by determining whether the requested torque is equal to or higher than the reference value. When YES in step S8 (i.e., when the driver is blipping the throttle), the ECU 52 determines in step S12 that the shift change is a downshift. When NO in step S8 (i.e., when the driver is not blipping the throttle), the ECU 52 determines in step S10 that the shift change is an upshift.

As described above, when the electrified vehicle is decelerating, the ECU 52 determines that the shift change is a downshift, regardless of whether the driver is blipping the throttle. When the electrified vehicle is accelerating or traveling at a constant speed and the driver is blipping the throttle, the ECU 52 determines that the shift change is a downshift. When the electrified vehicle is accelerating or traveling at a constant speed and the driver is not blipping the throttle, the ECU 52 determines that the shift change is an upshift.

When the ECU 52 determines in step S12 that the shift change is a downshift, the ECU 52 starts torque-up control in step S16. That is, the ECU 52 increases the torque command value for the motor 10 to increase the rotational speed of the motor 10. For example, in FIG. 6, the ECU 52 increases the torque command value at or after time t1 when the clutch 20 is disengaged. The rotational speed of the motor 10 therefore increases at or after time t1. When the driver is blipping the throttle, the ECU 52 increases the torque command value to a higher value to increase the rotational speed of the motor 10 faster. The ECU 52 continues to perform the torque-up control until step S22 or S24 that will be described later.

When the ECU 52 determines in step S10 that the shift change is an upshift, the ECU 52 starts torque-down control in step S14. That is, the ECU 52 reduces the torque command value for the motor 10 to reduce the rotational speed of the motor 10. For example, in FIG. 7, the ECU 52 reduces the torque command value at or after time t1 when the clutch 20 is disengaged. The rotational speed of the motor 10 therefore decreases at or after time t1. The ECU 52 continues to perform the torque-down control until step S22 or S24.

After step S14 or S16, the ECU 52 identifies the gear stage after the shift change in step S18. As described above, the ECU 52 identifies the gear stage before the shift change. When the shift change is an upshift, the ECU 52 identifies the gear stage that is one stage higher than the gear stage before the shift change, as the gear stage after the shift change. When the shift change is a downshift, the ECU 52 identifies the gear stage that is one stage lower than the gear stage before the shift change, as the gear stage after the shift change. In step S18, the combination of gear stages before and after the current shift change is thus identified. Hereinafter, the combination of gear stages before and after a shift change is sometimes referred to as the "type of shift change."

Next, the ECU 52 performs step S20. In step S20, the ECU 52 determines whether the ECU 52 has learned the shift characteristics corresponding to the type of shift change identified in step S18. That is, the ECU 52 accesses the data set regarding shift characteristics illustrated in FIG. 3 and determines whether the ECU 52 has learned the shift characteristics corresponding to the type of shift change identified in step S18. When the ECU 52 has learned the shift characteristics corresponding to the type of shift change identified in step S18, the ECU 52 determines YES in step S20. When the ECU 52 has not yet learned the shift characteristics corresponding to the type of shift change identified in step S18, the ECU 52 determines NO in step S20. In the examples of FIGS. 6 and 7, the ECU 52 has not yet learned the shift characteristics. Therefore, the ECU 52 determines NO in step S20. In this case, the ECU 52 performs step S24. In step S24, the ECU 52 monitors the rotational speed of the motor 10, and ends the torque-up control or the torque-down control as soon as the rotational speed of the motor 10 changes by a predetermined amount. For example, in FIG. 6, the ECU 52 ends the torque-up control at time t2 when the rotational speed of the motor 10 has increased by a predetermined amount $\Delta rx$. For example, in FIG. 7, the ECU 52 ends the torque-down control at time t2 when the rotational speed of the motor 10 has decreased by the predetermined amount $\Delta rx$. After the ECU 52 ends the torque-up control or the torque-down control, the ECU 52 controls the motor 10 to keep the rotational speed of the motor 10 constant.

In FIGS. 6 and 7, the rotational speed r2 indicates the rotational speed of the motor 10 after the torque-up control or the torque-down control. The rotational speed rh indicates the actual rotational speed of the input shaft 30a of the transmission 30 after the gear stage is changed. As described above, the ECU 52 changes the rotational speed of the motor 10 by the predetermined amount $\Delta rx$ when the ECU 52 has not yet learned the shift characteristics. Therefore, the rotational speed r2 cannot be accurately matched to the rotational speed rh.

During the shift change, the ECU 52 monitors the ratio between the amount of change in rotational speed of the motor 10 and the torque command value in a manner similar to that in step S2. When the driver engages the clutch 20, the value obtained by dividing the amount of change in rotational speed of the motor 10 by the torque command value decreases to a value less than the reference value. The ECU 52 therefore determines in step S26 that the clutch 20 is engaged. For example, in FIGS. 6 and 7, the clutch 20 is engaged at time t3.

When the ECU 52 detects that the clutch 20 is engaged, the ECU 52 performs step S28. In step S28, the ECU 52 determines whether the ECU 52 has learned the torsional characteristics corresponding to the type of shift change identified in step S18. That is, the ECU 52 accesses the data set regarding torsional characteristics illustrated in FIG. 3 and determines whether the ECU 52 has learned the torsional characteristics corresponding to the type of shift change identified in step S18. When the ECU 52 has not yet learned the torsional characteristics corresponding to the type of shift change identified in step S18, the ECU 52 determines NO in step S28 and skips steps S30, S32. That is, when the ECU 52 has not yet learned the torsional characteristics corresponding to the type of shift change identified in step S18, the ECU 52 does not perform the damping control in step S32.

As described above, when the ECU 52 has not yet learned the shift characteristics, the rotational speed r2 of the motor 10 cannot be accurately matched to the rotational speed rh of the input shaft 30a of the transmission 30 after the gear stage is changed. Moreover, when the ECU 52 has not yet learned the torsional characteristics, the ECU 52 does not perform the damping control after the clutch 20 is engaged. Therefore, a large shift shock occurs immediately after the clutch 20 is engaged. For example, in FIGS. 6 and 7, the rotational speed of the motor 10 fluctuates greatly during a period T1 immediately after time t3 when the clutch 20 is engaged. The rotational speed of the motor 10 also changes greatly before and after the period T1 during which the rotational speed of the motor 10 fluctuates. For example, in FIG. 6, when the clutch 20 is engaged at time t3, rotation of the output shaft 10a of the motor 10 is affected by rotation of the input shaft 30a of the transmission 30. The rotational speed of the motor 10 therefore increases to a rotational speed r3 that is substantially equal to the rotational speed rh of the input shaft 30a. In FIG. 7, when the clutch 20 is engaged at time t3, rotation of the output shaft 10a of the motor 10 is affected by rotation of the input shaft 30a of the transmission 30. The rotational speed of the motor 10 therefore decreases to the rotational speed r3 that is substantially equal to the rotational speed rh of the input shaft 30a. As described above, when the ECU 52 has not yet learned the shift characteristics and the torsional characteristics, the rotational speed of the motor 10 changes greatly after the clutch 20 is engaged. A large shift shock therefore occurs in the electrified vehicle.

The ECU 52 monitors the rotational speed of the motor 10 after the clutch 20 is engaged. The ECU 52 performs steps S34, S36 at time t4 when the fluctuations of the rotational speed of the motor 10 settle down.

In step S34, the ECU 52 stores the fluctuation waveform of the rotational speed of the motor 10 generated during the period T1, as the torsional characteristics. In this example, the ECU 52 stores the detected fluctuation waveform as the torsional characteristics corresponding to the type of shift change identified in step S18.

In step S36, the ECU 52 detects the rotational speed r3 of the motor 10 at time t4. Thereafter, in step S38, the ECU 52 calculates the rate of change r3/r1 of the rotational speed of the motor 10 before and after the shift change by dividing the rotational speed r3 by the rotational speed r1. The rotational speed r1 of the motor 10 before the shift change is equal to the rotational speed of the input shaft 30a of the transmission 30 before the shift change. The rotational speed r3 of the motor 10 after the shift change is equal to the rotational speed of the input shaft 30a of the transmission 30 after the shift change. Therefore, the rate of change r3/r1 is equal to the rate of change of the rotational speed of the input shaft 30a of the transmission 30 before and after the shift change. The ECU 52 stores the rate of change r3/r1 as the shift characteristics. The ECU 52 stores the rate of change r3/r1 calculated in step S38 as the shift characteristics corresponding to the type of shift change identified in step S18.

When the gear stage before the shift change has a speed ratio A, the rotational speed rs of the output shaft 30b of the transmission 30 at the start of the shift change satisfies the relation rs=r1/A. There is almost no change in rotational speed rs of the output shaft 30b before and after the shift change. When the gear stage after the shift change has a speed ratio B, the rotational speed rh of the input shaft 30a of the transmission 30 after the shift change satisfies the relation rh=B·rs=(B/A)·r1 (hereinafter referred to as Expression 1). Since the rotational speed r3 of the motor 10 after the shift change is equal to the rotational speed rh of the input shaft 30a of the transmission 30 after the shift change, the rotational speed r3 of the motor 10 after the shift change satisfies the relation r3=rh (hereinafter referred to as Expression 2). The relation r3/r1=B/A (hereinafter referred to as Expression 3) is obtained from Expressions 1 and 2. That is, the rate of change r3/r1 is substantially equal to the ratio of the speed ratio B of the gear stage after the shift change to the speed ratio A of the gear stage before the shift change. A predicted value of the rotational speed rh of the input shaft 30a of the transmission 30 after the shift change can be calculated by multiplying the rate of change r3/r1 by the rotational speed of the motor 10 before the shift change. The shift characteristics are thus a value that allows prediction of the rotational speed rh of the input shaft 30a after the shift change.

In the present embodiment, the shift characteristics are the rate of change r3/r1. However, other values may be used as the shift characteristics. For example, the shift characteristics may be a function, database, etc. that allows the predicted value of the rotational speed rh of the input shaft 30a after the shift change to be calculated based on the type of shift change and the rotational speed of the motor 10 at the start of the shift change. In the case where the ECU 52 learns the shift characteristics for each shift change, the shift characteristics may be a function, database, etc. that allows the predicted value of the rotational speed rh of the input shaft 30a after the shift change to be calculated based on the rotational speed of the motor 10 at the start of the shift change.

As described above, when the ECU 52 has not yet learned the shift characteristics and the torsional characteristics, the ECU 52 learns the shift characteristics and the torsional characteristics.

Figure 8:
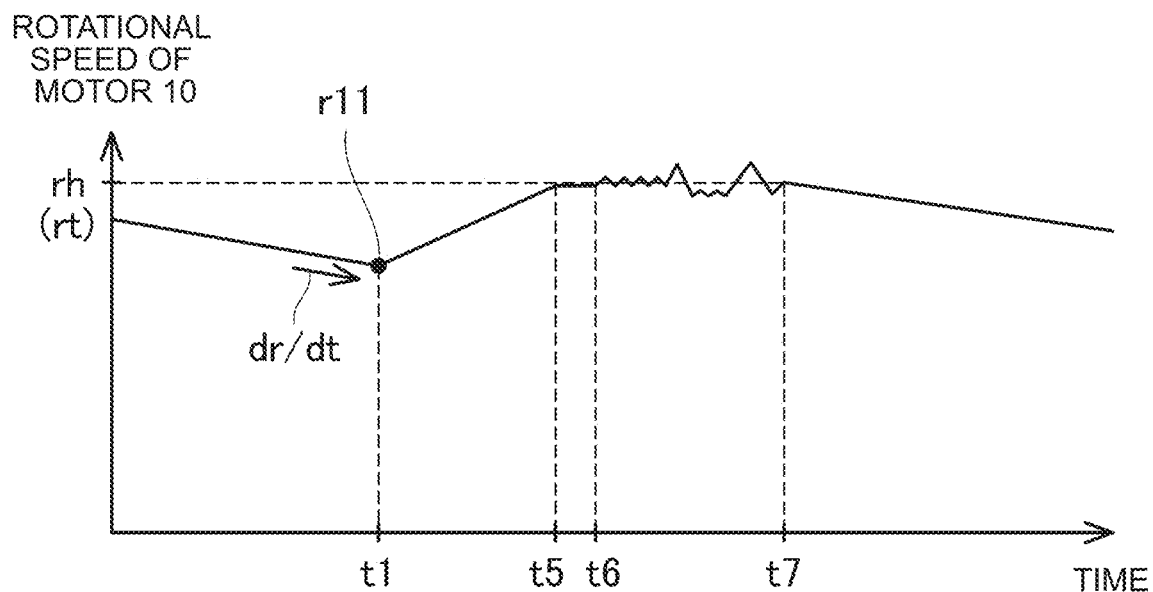
FIG. 8 is a graph showing the rotational speed of the motor during a downshift when the ECU has learned the shift characteristics and the torsional characteristics.
Figure 9:
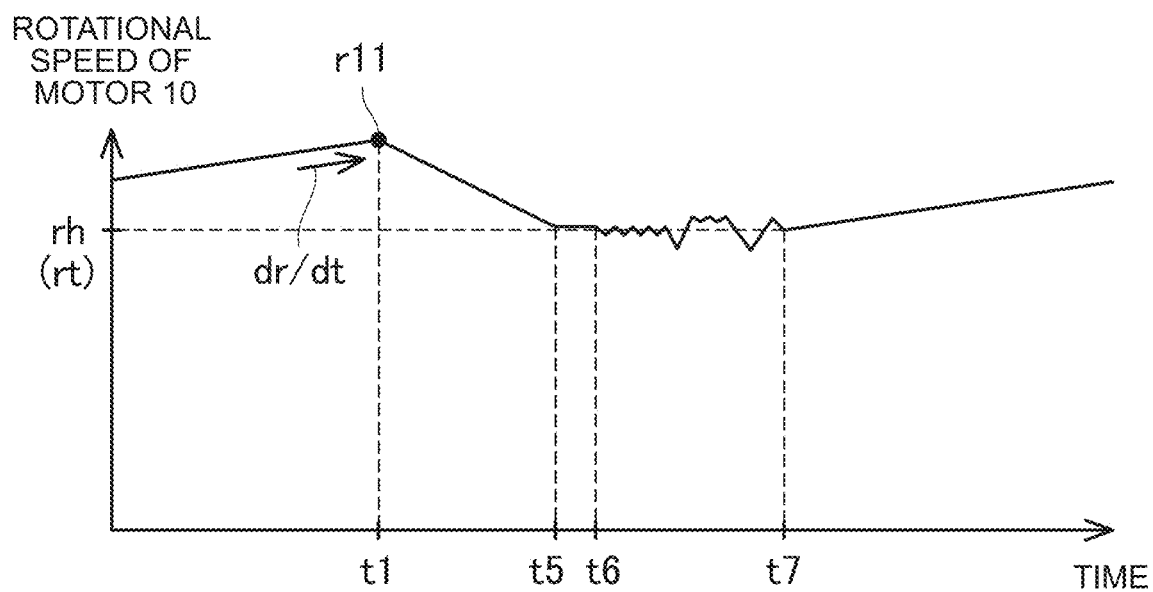
FIG. 9 is a graph showing the rotational speed of the motor during an upshift when the ECU has learned the shift characteristics and the torsional characteristics.

Next, a shift change when the ECU 52 has learned the shift characteristics and the torsional characteristics will be described. FIGS. 8 and 9 illustrate changes in rotational speed of the motor 10 during a shift change when the ECU 52 has learned the shift characteristics and the torsional characteristics.

Even when the ECU 52 has learned the shift characteristics and the torsional characteristics, the ECU 52 performs steps S2 to S18 in a manner similar to when the ECU 52 has not yet learned the shift characteristics and the torsional characteristics. Therefore, in FIGS. 8 and 9, as in FIGS. 6 and 7, the ECU 52 detects at time t1 that the clutch 20 is disengaged, detects the rotational speed of the motor 10 at time t1 (hereinafter referred to as the "rotational speed r11"), and performs the torque-down control or the torque-up control at or after time t1.

When the ECU 52 has learned the shift characteristics, the ECU 52 determines YES in step S20. The ECU 52 then performs step S22. In step S22, the ECU 52 reads from the storage area the shift characteristics corresponding to the type of shift change identified in step S18. The ECU 52 calculates a predicted value rt of the rotational speed of the input shaft 30a of the transmission 30 after the shift change from the read shift characteristics and the rotational speed r11 of the motor 10 detected in step S4. For example, when the shift characteristics are the rate of change r3/r1, the ECU 52 calculates the predicted value rt by the expression rt= (r3/r1)·r11. The ECU 52 then sets the control target value of the rotational speed of the motor 10 to the predicted value rt. Therefore, as shown in FIGS. 8 and 9, the ECU 52 performs the torque-up control or the torque-down control until the rotational speed of the motor 10 becomes equal to the control target value rt. After the rotational speed of the motor 10 becomes equal to the control target value rt at time t5, the ECU 52 controls the rotational speed of the motor 10 so that the rotational speed of the motor 10 remains equal to the control target value rt. Therefore, the rotational speed of the motor 10 is substantially equal to the control target value rt immediately after time t5. The control target value rt for the motor 10 is maintained until the shift change is completed (i.e., time t7 in FIGS. 8 and 9).

Thereafter, in step S26, the ECU 52 detects that the clutch 20 is engaged. In FIGS. 8 and 9, the clutch 20 is engaged at time t6. After the clutch 20 is engaged, the rotational speed of the motor 10 fluctuates. As described above, before the clutch 20 is engaged, the rotational speed of the motor 10 is controlled to the control target value rt that is substantially equal to the rotational speed rh of the input shaft 30a of the transmission 30 after the shift change. Therefore, in FIGS. 8 and 9, the rotational speed of the motor 10 fluctuates slightly after the clutch 20 is engaged, and the rotational speed of the motor 10 changes slightly before and after the fluctuations occur. As described above, when the ECU 52 has learned the shift characteristics, the ECU 52 controls the rotational speed of the motor 10 to a value substantially equal to the rotational speed rh before the clutch 20 is engaged. Therefore, a shift shock is small.

When the ECU 52 detects in step S26 that the clutch 20 is engaged, the ECU 52 performs the damping control as necessary in steps S28 to S32.

When the ECU 52 has learned the torsional characteristics corresponding to the type of shift change identified in step S18, the ECU 52 determines YES in step S28 and performs step S30. When the amplitude of the torsional characteristics corresponding to the type of shift change identified in step S18 (that is, the amplitude of the fluctuation waveform of the rotational speed detected in the learning process) is less than a reference value in step S30, the ECU 52 determines NO in step S30 and does not perform the damping control. When the amplitude of the torsional characteristics corresponding to the type of shift change identified in step S18 is equal to or larger than the reference value, the ECU 52 determines YES in step S30 and performs the damping control in step S32.

Figure 10:
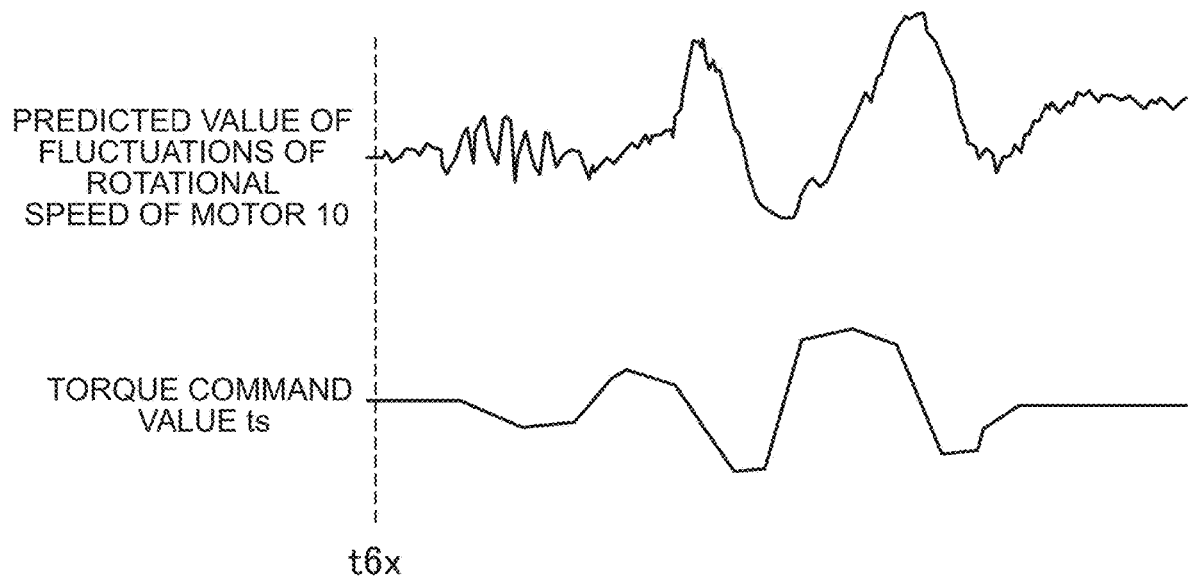
FIG. 10 is a graph showing a predicted value of fluctuations and a torque command value in damping control.

FIG. 10 shows a predicted value of the fluctuations of the rotational speed of the motor 10 and a torque command value is for the motor 10 in the damping control. At time t6x (substantially the same time as time t6 in FIGS. 8 and 9), namely at the start of the damping control, the ECU 52 reads from the storage area the torsional characteristics corresponding to the type of shift change identified in step S18, and calculates a predicted value of the fluctuations that will occur after time t6x. The frequency of the fluctuations that will occur after the clutch 20 is engaged is determined by the structure of the drive system (e.g., the resonance frequency of the drive system). Therefore, the ECU 52 can predict the fluctuations that will occur after time t6x from the torsional characteristics (i.e., the fluctuation waveform detected in the learning process). After calculating the predicted value of the fluctuations that will occur after time t6x, the ECU 52 calculates a predicted value of the torque that will be applied to a rotating shaft of the motor 10 due to the fluctuations by, for example, differentiating the calculated predicted value of the fluctuations. The ECU 52 then calculates the torque command value ts so as to cancel the calculated predicted value of the torque. After time t6x, the ECU 52 controls the torque of the motor 10 according to the graph of the calculated torque command value ts. As a result, the fluctuations of the rotational speed of the motor 10 that will occur after the clutch 20 is engaged are reduced. As described above, the fluctuations of the rotational speed of the motor 10 are further reduced by performing the damping control.

Thereafter, the ECU 52 performs steps S34 to S38. When the ECU 52 has learned the torsional characteristics, the ECU 52 may either skip step S34 (i.e., the learning process for the torsional characteristics) or perform step S34. Performing step S34 when the ECU 52 has learned the torsional characteristics sometimes allows more accurate damping control. When the ECU 52 has learned the shift characteristics, the ECU 52 may either skip steps S36, S38 (i.e., the learning process for the shift characteristics) or perform steps S36, S38. Performing steps S36, S38 when the ECU 52 has learned the shift characteristics sometimes allows the rotational speed of the motor 10 to be more accurately matched to the rotational speed of the input shaft 30a of the transmission 30.

Figure 11:
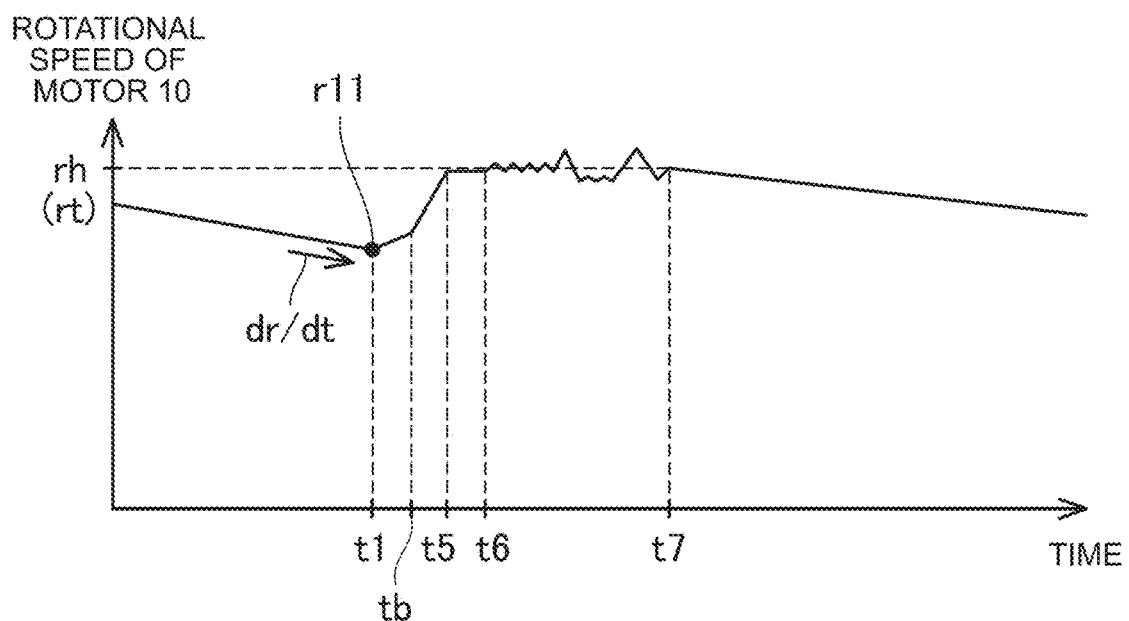
FIG. 11 is a graph showing the rotational speed of the motor during throttle blipping.

When the requested torque is equal to or higher than the reference value after the clutch 20 is engaged (i.e., when the driver is blipping the throttle), the ECU 52 increases the torque value in the torque-up control to a higher value than when the driver is not blipping the throttle. As shown in FIG. 11, when the driver blips the throttle with the ECU 52 having learned the shift characteristics, the ECU 52 increases the torque command value for the motor 10 to a higher value at or after time tb when the throttle blipping is detected. As a result, the rotational speed of the motor 10 increases faster at or after time tb. Therefore, the rotational speed of the motor 10 can be more quickly controlled to the control target value rt. Accordingly, when the driver is blipping the throttle, a shift change can be more quickly performed with a small shift shock.

As described above, the ECU 52 estimates that the gear stage has been changed by one stage at each shift change. However, there are cases where the driver performs a skip shift. For example, the driver may upshift from second gear to fourth gear or may downshift from fourth gear to second gear. In this case, the control target value rt becomes a value significantly different from the actual rotational speed rh of the input shaft 30a, and the rotational speed of the motor 10 may significantly increase or decrease immediately after time t6 when the clutch 20 is engaged. When the ECU 52 maintains the control target value rt as the target value of the rotational speed of the motor 10 in this case, the behavior of the motor 10 may become abnormal. Accordingly, in a case where the rotational speed of the motor 10 changes (i.e., increases or decreases) with a gradient equal to or greater than a predetermined reference value (a second reference value) immediately after time t6 when the clutch 20 is engaged, the ECU 52 may stop the control of keeping the rotational speed of the motor 10 at the control target value rt.

In the above embodiment, the ECU 52 learns the torsional characteristics for each type of shift change. However, when the torsional characteristics are almost the same among the types of shift change, the ECU 52 may learn one kind of torsional characteristics (i.e., common torsional characteristics). In this case, damping control based on common torsional characteristics can be performed for all types of shift change.

Steps S36, S38 are an example of the learning process of detecting the first rotational speed and the second rotational speed. Step S22 is an example of the control process of changing the rotational speed of the motor based on the first rotational speed and the second rotational speed. Step S34 is an example of the learning process of detecting the fluctuation waveform. Step S32 is an example of the control process of controlling the motor so as to reduce the fluctuations of the rotational speed of the motor based on the fluctuation waveform. Time t1 is an example of the first time. Time t4 is an example of the second time. Time t6 is an example of the third time.

Although the embodiment is described in detail above, the embodiment is merely illustrative and is not intended to limit the claims. The technology described in the claims includes various modifications and alterations of the specific examples illustrated above. The technical elements described in the present specification or illustrated in the drawings exhibit technical utility solely or in various combinations, and are not limited to the combinations described in the claims as filed. The technology described in the present specification or illustrated in the drawings may achieve a plurality of objects at the same time, and exhibit technical utility by achieving one of the objects.

What is claimed is:

1. An electrified vehicle comprising:
a motor;
a clutch;
a transmission including an input shaft and an output shaft, the input shaft being connected to the motor through the clutch, the output shaft being configured to transmit power to a drive wheel, and the transmission being configured to change a gear stage for transmitting the power from the input shaft to the output shaft;
a rotational speed sensor configured to detect a rotational speed of the motor; and
a control circuit configured to control the motor, wherein:
the electrified vehicle is configured to perform a shift change in which the gear stage is changed after the clutch is disengaged and the clutch is engaged after the gear stage is changed; and
the control circuit is configured to perform
a learning process of detecting a change in the rotational speed of the motor by the rotational speed sensor when the shift change is performed, and
a control process of controlling the rotational speed of the motor based on the change in the rotational speed detected in the learning process, when the shift change is performed after the learning process.

2. The electrified vehicle according to claim 1, wherein in the learning process, the control circuit detects a first rotational speed and a second rotational speed, the first rotational speed being a rotational speed of the motor at first time, the second rotational speed being a rotational speed of the motor at second time, the first time being when the clutch is disengaged, and the second time being when fluctuations of the rotational speed of the motor that occur after the clutch is engaged settle down, and
in the control process, the control circuit changes the rotational speed of the motor in a period from the first time to third time based on the first rotational speed and the second rotational speed, the third time being when the clutch is engaged.

3. The electrified vehicle according to claim 2, wherein when the shift change in the control process is an upshift, the control circuit reduces the rotational speed of the motor within the period from the first time to the third time, and
when the shift change in the control process is a downshift, the control circuit increases the rotational speed of the motor within the period from the first time to the third time.

4. The electrified vehicle according to claim 3, wherein when the shift change in the control process is the downshift, the control circuit increases the rotational speed of the motor faster when requested torque for the motor after the clutch is disengaged is equal to or higher than a first reference value than when the requested torque for the motor after the clutch is disengaged is less than the first reference value.

5. The electrified vehicle according to claim 2, wherein in the control process, the control circuit performs rotational speed control of keeping a target rotational speed of the motor constant from the third time to the second time, and stops the rotational speed control when the rotational speed of the motor detected by the rotational speed sensor after the third time changes with a gradient equal to or greater than a second reference value.

6. The electrified vehicle according to claim 1, wherein
in the learning process, the control circuit detects a fluctuation waveform of the rotational speed of the motor generated after the clutch is engaged, and
in the control process, the control circuit controls the motor so as to reduce fluctuations of the rotational speed of the motor that are going to occur after the clutch is engaged, based on the fluctuation waveform detected in the learning process.

7. The electrified vehicle according to claim 1, wherein
the control circuit stores in a storage area the change in the rotational speed for each of combinations of the gear stages before and after the shift change, and
in the control process, the control circuit estimates a combination of the gear stages before and after the shift change, reads the change in the rotational speed corresponding to the estimated combination from the storage area, and controls the rotational speed of the motor based on the read change in the rotational speed.

8. The electrified vehicle according to claim 7, wherein
the control circuit estimates that the gear stage when the electrified vehicle is started is first gear,
when the shift change is an upshift, the control circuit estimates that the gear stage has been shifted up by one stage, and
when the shift change is a downshift, the control circuit estimates that the gear stage has been shifted down by one stage.

9. The electrified vehicle according to claim 4, wherein
the control circuit determines whether the shift change is the upshift or the downshift based on a gradient of the change in the rotational speed of the motor before the clutch is disengaged.

10. The electrified vehicle according to claim 4, wherein the control circuit determines whether the shift change is the upshift or the downshift based on a gradient of the change in the rotational speed of the motor before the clutch is disengaged and the requested torque for the motor after the clutch is disengaged.

11. The electrified vehicle according to claim 1, wherein the control circuit determines whether the clutch is engaged or disengaged based on a ratio between an amount of change in the rotational speed of the motor detected by the rotational speed sensor and drive torque of the motor.

12. A method for manufacturing the electrified vehicle according to claim 1, the method comprising:
   preparing a vehicle including an engine connected to the input shaft of the transmission through the clutch; and
   replacing the engine of the vehicle with the motor.

* * * * *